US008736431B2

(12) United States Patent
Jones et al.

(10) Patent No.: US 8,736,431 B2
(45) Date of Patent: May 27, 2014

(54) TACTILE VISUAL INDICATOR

(75) Inventors: Phillip D. Jones, Raleigh, NC (US); Adrian X. Rodriguez, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 13/178,031

(22) Filed: Jul. 7, 2011

(65) Prior Publication Data

US 2013/0009758 A1 Jan. 10, 2013

(51) Int. Cl.
*G09B 21/00* (2006.01)
*H04B 3/36* (2006.01)
*G08B 5/00* (2006.01)

(52) U.S. Cl.
USPC .................. 340/407.2; 340/815.42; 340/4.12; 340/4.1

(58) Field of Classification Search
USPC .............. 340/407.1, 407.2, 4.1–4.14, 815.42, 340/815.43; 434/112–117; 379/51
See application file for complete search history.

(56) References Cited

U.S. PATENT DOCUMENTS 4,405,197 A 9/1983 Bejczy
4,668,861 A 5/1987 White
5,669,148 A * 9/1997 McDermott ................ 33/355 R
5,942,970 A * 8/1999 Norman ..................... 340/407.1
6,005,496 A 12/1999 Hargreaves et al.
6,361,357 B1 * 3/2002 Stillwell et al. ............... 439/490
7,051,292 B2 5/2006 Nagase
7,071,434 B1 * 7/2006 McConnell et al. .......... 200/310
7,098,411 B1 * 8/2006 McConnell et al. .......... 200/5 R
7,113,177 B2 9/2006 Franzen
7,264,175 B2 * 9/2007 Schwendinger et al. ....... 236/94
7,355,165 B2 * 4/2008 Shaw et al. .............. 250/231.13
7,554,522 B2 6/2009 Sinclair, II et al.
7,670,039 B2 * 3/2010 Altonen et al. ............... 362/555
7,723,896 B2 5/2010 Esashi et al.
8,248,218 B2 * 8/2012 Yamaya ...................... 340/407.2
8,299,905 B2 * 10/2012 King .......................... 340/407.1
2005/0097179 A1 5/2005 Orme
2005/0223801 A1 * 10/2005 Kim et al. ....................... 73/573
2006/0066579 A1 3/2006 Bladt
2010/0073328 A1 3/2010 Lynch et al.
2010/0275163 A1 10/2010 Gillespie et al.

* cited by examiner

*Primary Examiner* — Daniel Wu
*Assistant Examiner* — Mohamed Barakat
(74) *Attorney, Agent, or Firm* — Brandon C. Kennedy; Katherine S. Brown; Biggers Kennedy Lenart Spraggins LLP

(57) ABSTRACT

A tactile visual indicator and methods, apparatuses, and computer program products for controlling a tactile visual indicator are provided. Embodiments include a light source; an electromagnetically inductive wound coil; and a light pipe coupled to a ferromagnetic-metal jacket surrounding the outside of the light pipe. The ferromagnetic-metal jacket is within the wound coil and one end of the light pipe is provided to the light source. The light pipe and the ferromagnetic-metal jacket are configured to move within the wound coil in response to the coil receiving power. Light shining through the light pipe from the light source provides a visual indication of a status and the movement of the light pipe and jacket within the wound coil provides a tactile indication of the status via contact with a user.

20 Claims, 5 Drawing Sheets

TACTILE VISUAL INDICATOR

BACKGROUND OF THE INVENTION

1. Field of the Invention

The field of the invention is data processing, or, more specifically, a tactile visual indicator and methods, apparatuses, and computer program products for controlling a tactile visual indicator.

2. Description of Related Art

Often a need arises for an electrical device to provide to a user an indication of a status. For example, if a user presses a 'Caps Lock' key on a keyboard, the keyboard will use a light emitting diode (LED) to signal that the 'Caps Lock' key is activated. However, for a user with a visual impairment, the light provided by the LED is not an effective indication.

SUMMARY OF THE INVENTION

A tactile visual indicator and methods, apparatuses, and computer program products for controlling a tactile visual indicator are provided. Embodiments include a light source; an electromagnetically inductive wound coil; and a light pipe coupled to a ferromagnetic-metal jacket surrounding the outside of the light pipe. The ferromagnetic-metal jacket is within the wound coil and one end of the light pipe is provided to the light source. The light pipe and the ferromagnetic-metal jacket are configured to move within the wound coil in response to the coil receiving power. Light shining through the light pipe from the light source provides a visual indication of a status and the movement of the light pipe and jacket within the wound coil provides a tactile indication of the status via contact with a user.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1A:
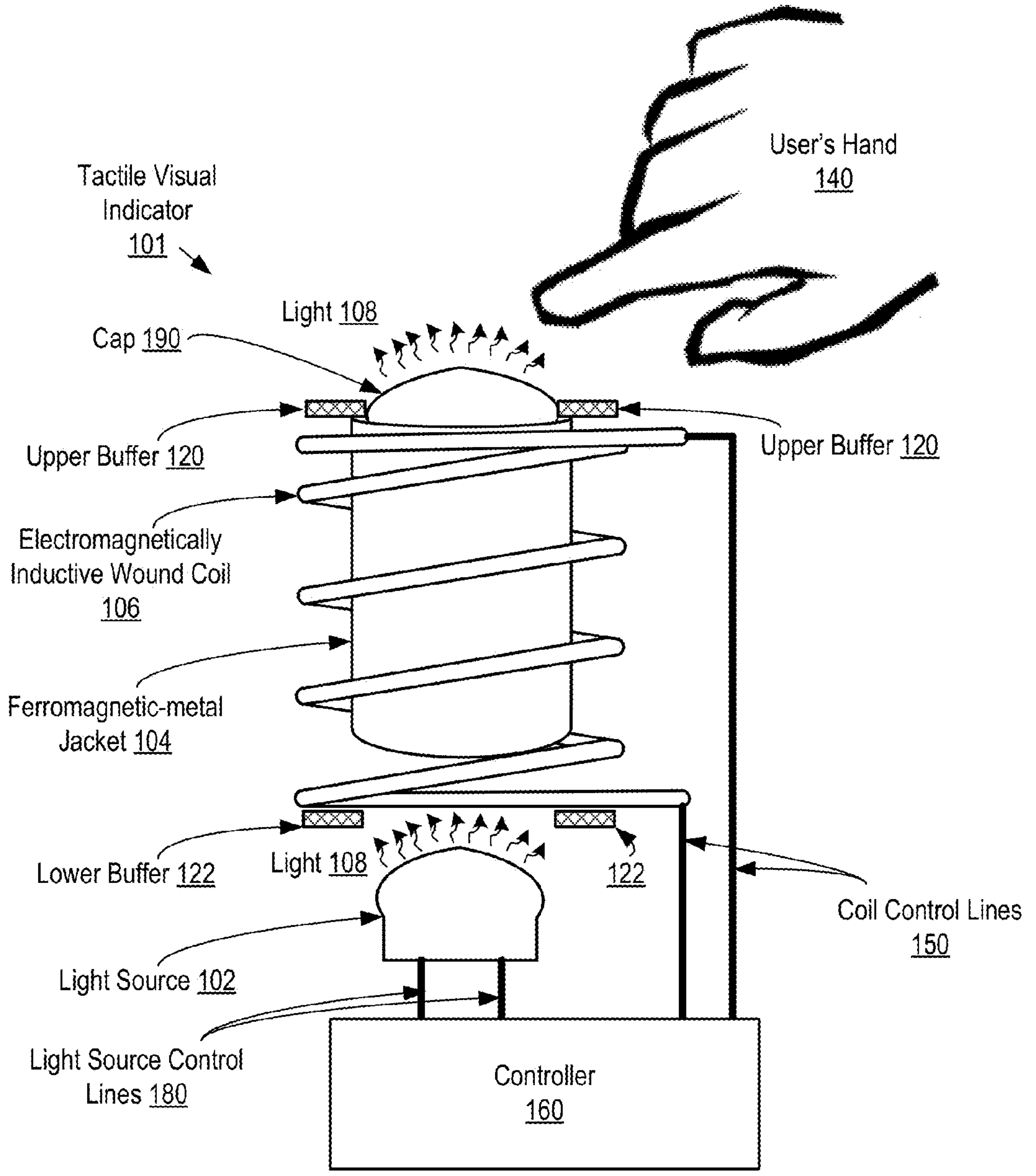
FIG. 1A sets forth a diagram of a tactile visual indicator according to embodiments of the present invention.
Figure 1B:
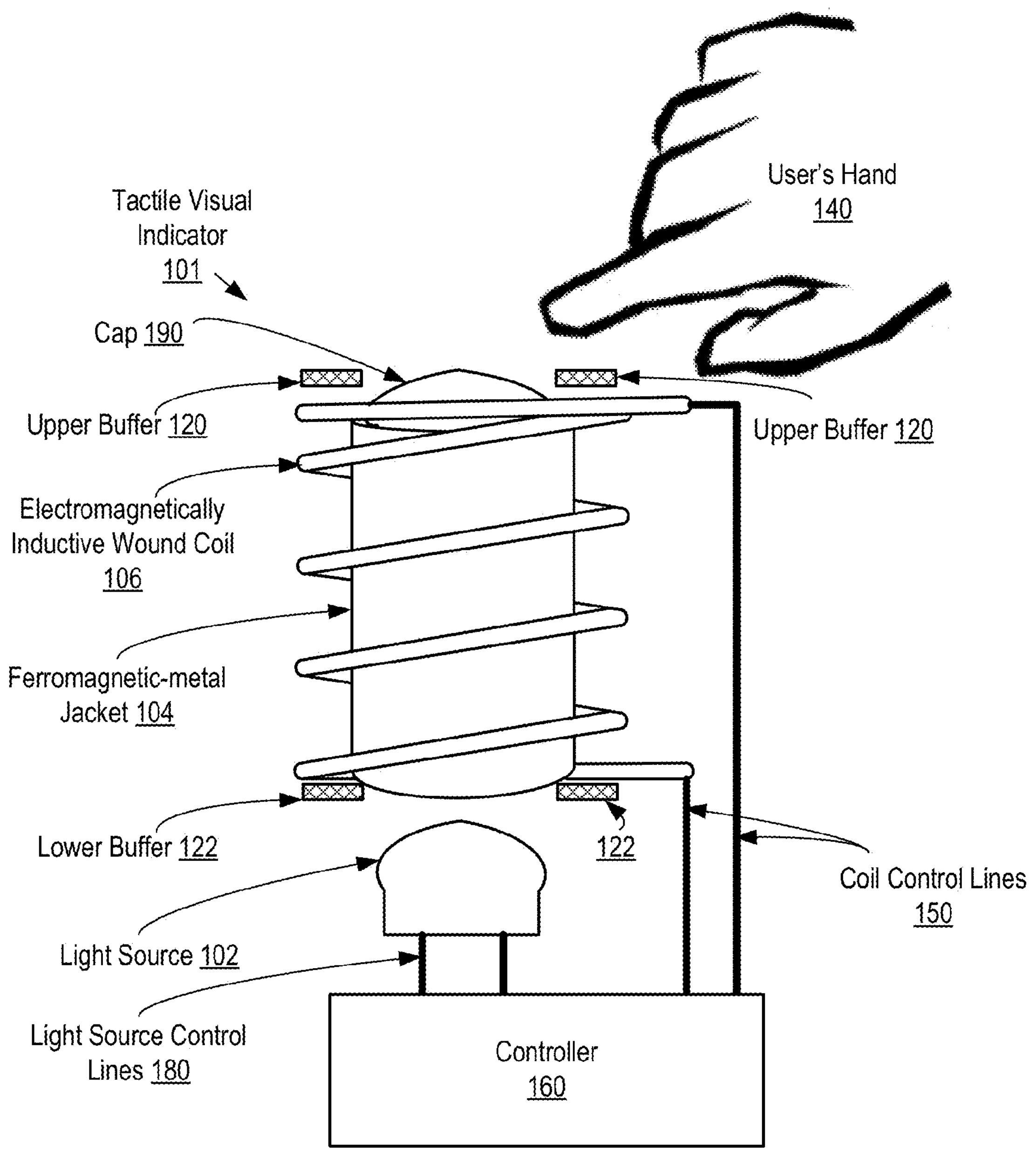
FIG. 1B sets forth a diagram of another example tactile visual indicator according to embodiments of the present invention.
Figure 1C:
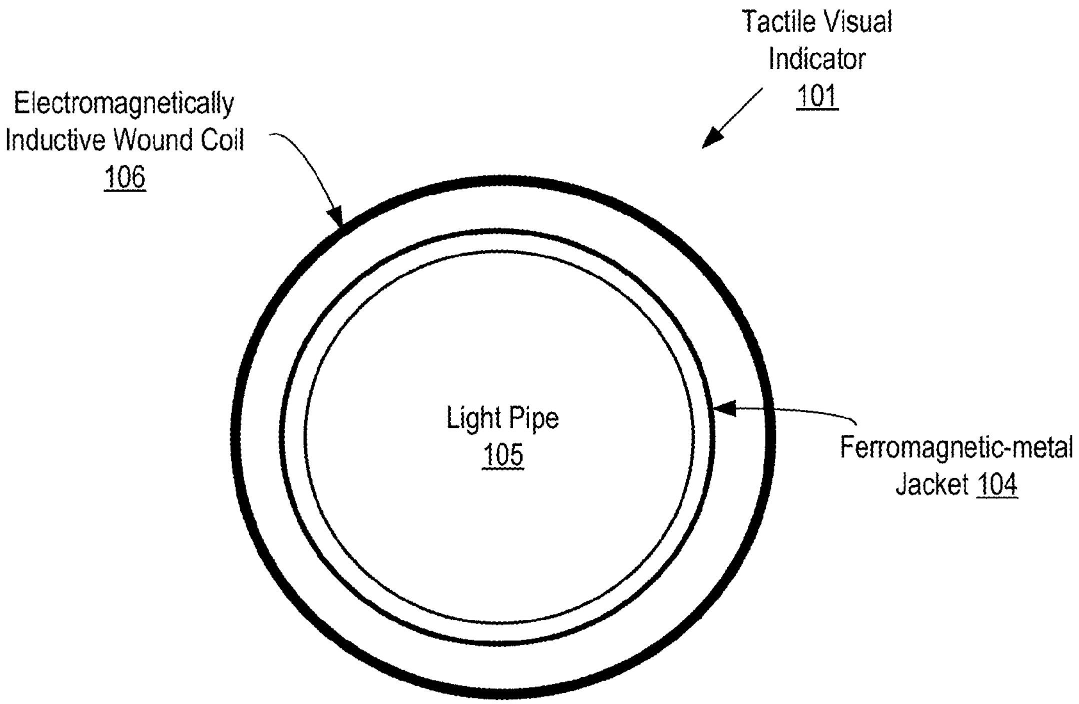
FIG. 1C sets forth a diagram of another example tactile visual indicator according to embodiments of the present invention.

Exemplary tactile visual indicators and methods, apparatuses, and computer program products for controlling a tactile visual indicator in accordance with the present invention are described with reference to the accompanying drawings, beginning with FIGS. 1A, 1B, and 1C. FIGS. 1A, 1B, and 1C set forth a diagram of a tactile visual indicator (101) according to embodiments of the present invention. The tactile visual indicator (101) includes a light source (102), an electromagnetically inductive wound coil (106), a light pipe (105), and a ferromagnetic-metal jacket (104) surrounding the outside of the light pipe (105).

A light source is any device capable of generating light. The light source (102) of FIG. 1 is a light emitting diode (LED). An LED is a semiconductor light source. When a light-emitting diode is forward biased (switched on), electrons are able to recombine with electron holes within the device, releasing energy in the form of photons. This effect is called electroluminescence and the color of the light (corresponding to the energy of the photon) is determined by the energy gap of the semiconductor. An LED is often small in area (less than 1 mm), and integrated optical components may be used to shape its radiation pattern.

An electromagnetically inductive wound coil is a coil wound into a tightly packed helix, also referred to as a solenoid. The wound coil (106) of FIG. 1 is a wire made of a metal capable of transmitting an electric current. The wound coil (106) is wound such that a magnetic field is produced when an electric current is passed through the wound coil (106).

A light pipe is a structure for transporting light to another location while minimizing the loss of light. Molded plastic light pipes are commonly used in the electronics industry to conduct illumination from LEDs on a circuit board to indicator symbols or buttons. These light pipes may take on a highly complex shape that uses either gentle curving bends as in an optic fiber or have sharp prismatic folds which reflect off the angled corners. Multiple light tubes are often molded from a single piece of plastic, permitting easy device assembly since the long thin light tubes are all part of a single rigid component that snaps into place. In the example of FIGS. 1A and 1B, the light pipe (105) includes a cap (190) on the end opposite the end provided to the light source (102). A light pipe cap may be composed of material, such as plastic or glass, which allows light from a light pipe to pass through for viewing by a user.

A ferromagnetic-metal jacket is a structure comprising a metal that is attracted to magnets, such as iron, copper or nickel. FIG. 1C illustrates a cross sectional view of the tactile visual indicator (101) with the ferromagnetic-metal jacket (104) wrapped around the light pipe (105). However, a jacket may also be considered part of a light pipe. The combined structure of the light pipe (105) and jacket (104) is housed within the wound coil (106). When an electric current passes through the wound coil (106), the coil (106) produces a magnetic field. The magnetic field applies a force to the jacket (104) thereby causing the jacket (104) to move within the wound coil (106). The direction that the jacket (104) moves within the wound coil (106) may be controlled by the direction of the magnetic field produced within the wound coil (106), which is determined by the direction of electric current passing through the wound coil (106).

The tactile visual indicator (101) includes a controller (160) that is configured to regulate the power supplied to the light source (102) and the wound coil (106). In the example of FIGS. 1A and 1B, the controller (160) is coupled to the light source (102) via light source control lines (180) and to the wound coil (106) via coil control lines (150).

FIG. 1A illustrates the tactile visual indicator (101) providing two indications of a status of a particular instrument. In the example of FIG. 1A, the light source (102) is producing light (108) and the light pipe cap (190) is extending out of the wound coil (106). When the light source (102) is generating light (108), the light (108) passes into one end of the light pipe (105) and out the other end with the cap (190). The light (108)

coming out of the cap (190) is a visual indication of a status. For example, if the cap (190) is emitting light, then the status of a particular instrument may be 'ON.'

The tactile visual indicator (101) of FIG. 1A generates a second indication in addition to the visual indication of the light (108) passing through the cap (190). In the example of FIG. 1A, an electric current is passing through the wound coil (106). The electric current in the wound coil (106) generates a magnetic field that forces the jacket (104) and light pipe (105) to move away from the light source (102) such that the cap (190) extends out of the wound coil (106). The tactile visual indicator (101) includes an upper buffer (120) and a lower buffer (122) which are positioned within the tactile visual indicator to limit the motion of the jacket (104) and light pipe (105) within the wound coil (106). The upper buffer (120) of FIG. 1A enables the light pipe (105) and jacket (104) to extend far enough to enable the cap (190) to extend out of the wound coil (106). If a user places his or her hand (140) on the tactile visual indicator (101), the user may detect the extension of the cap (190). That is, the tactile visual indicator (101) of FIG. 1A provides a tactile indication of the status of a particular instrument. The controller (160) of FIG. 1 may be configured to regulate the power supplied to the electric coil (106) and the light source (102) so that the visual indication provided by the light source (102) and the tactile indication provided by the cap (190) of the light pipe (105) provide two separate and distinct indications. That is, a user with a visual impairment may be able to feel the tactile indication even if he or she is unable to see the visual indication provided by the light source. Because the tactile visual indicator (101) provides two indications, a user with no visual impairment may be able to both see and feel indications regarding the status of a particular instrument.

FIG. 1B illustrates the tactile visual indicator providing two indications of an alternative status than the status illustrated in FIG. 1A. In the example of FIG. 1B, the light source (102) is not producing light (108) and the light pipe cap (190) is not extending out of the wound coil (106). That is, the absence of light emitting out of the cap (190) is a visual indication of a status. For example, if the cap (190) is not emitting light, then the status of a particular instrument may be 'OFF.'

The tactile visual indicator (101) of FIG. 1B generates a second indication in addition to the visual indication of the absence of light emitting from the cap (190). In the example of FIG. 1B an electric current may or may not be used to move the jacket (104) and the light pipe (105). For example, if the tactile visual indicator (101) is placed 'right-side-up,' gravity will pull the jacket (104) and light pipe (105) toward the light source (102) when the electric current is not applied to the wound coil (106). As another example, an electric current may be applied to generate a magnetic field that forces the jacket (104) and light pipe (105) to move toward the light source (102) such that the cap (190) does not extend out of the wound coil (106). In either case, if a user places his or her hand (140) on the tactile visual indicator (101), the user may detect the absence of the cap (190). That is, the tactile visual indicator (101) of FIG. 1A provides a tactile indication of the status of a particular instrument.

Controlling a tactile visual indicator in accordance with the present invention is generally implemented with computers, that is, with automated computing machinery. In the tactile visual indicator (101) of FIG. 1, for example, the controller (160) is implemented to some extent at least as a computer. For further explanation, therefore, FIG. 2 sets forth a block diagram of automated computing machinery comprising an exemplary controller computer (252) useful in controlling a tactile visual indicator (101) according to embodiments of the present invention. The computer (252) of FIG. 2 includes at least one computer processor (256) or 'CPU' as well as random access memory (268) ('RAM') which is connected through a high speed memory bus (266) and bus adapter (258) to processor (256) and to other components of the computer (252).

Figure 2:
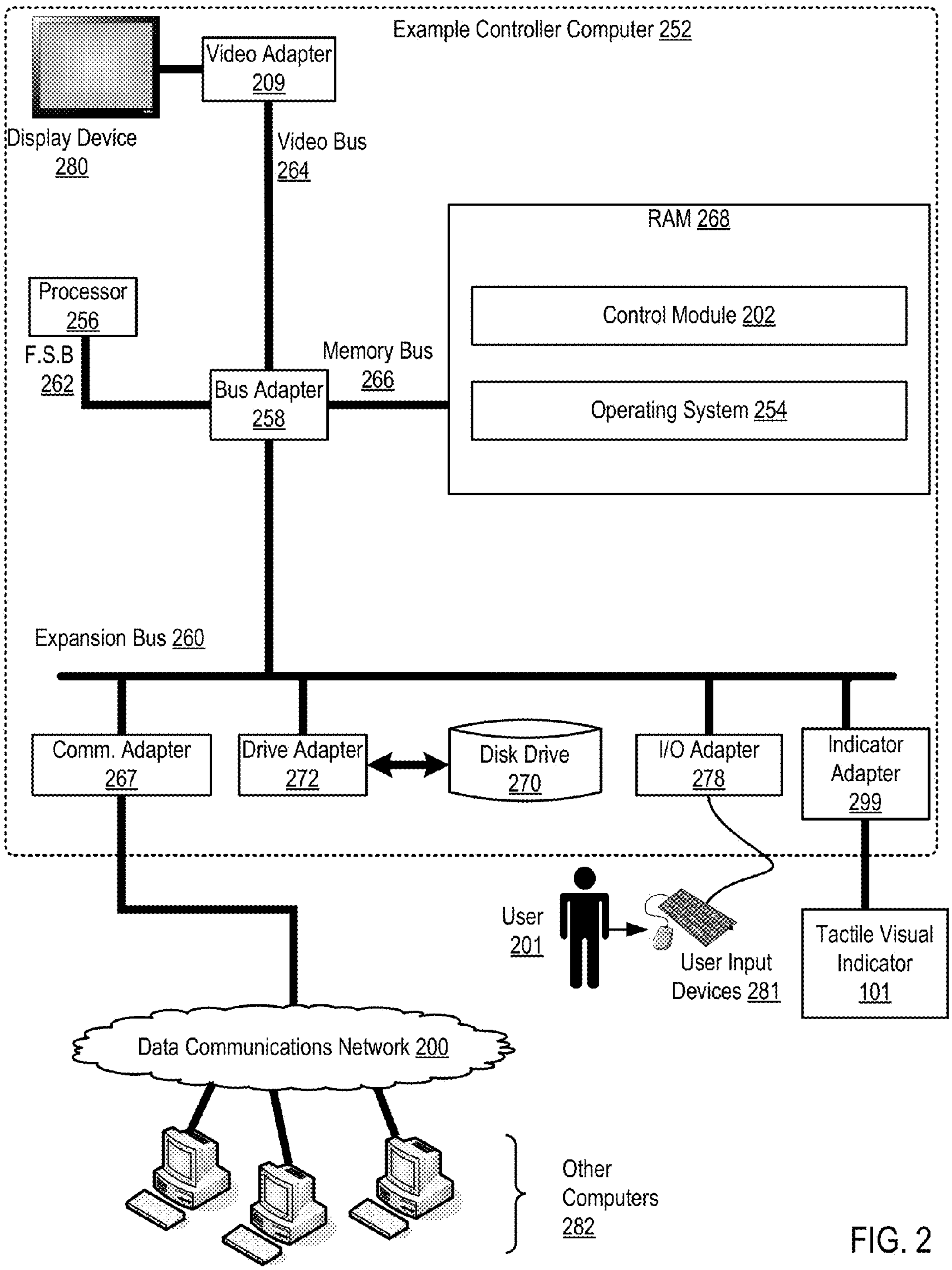
FIG. 2 sets forth a block diagram of automated computing machinery comprising an exemplary controller computer useful in controlling a tactile visual indicator according to embodiments of the present invention FIG. 3 sets forth a flow chart illustrating an exemplary method for controlling a tactile visual indicator according to embodiments of the present invention.

Stored in RAM (168) is a control module (202) with computer program instructions for controlling the tactile visual indicator (101) according to embodiments of the present invention. The control module (202) includes computer program instructions that when executed by the processor (256) cause the processor (256) to provide a visual indication of a status, where providing the visual indication includes regulating power supplied to a light source. The control module (202) also includes computer program instructions that when executed by the processor (256) cause the processor (256) to provide a tactile indication of the status, where providing the tactile indication includes regulating power supplied to an electromagnetically inductive wound coil. In the example of FIG. 2, the example controller computer (252) controls the tactile visual indicator (101) via a controller adapter (299) that is configured to transmit commands from the processor (156) to power supply signals for the tactile visual indicator (101).

Also stored in RAM (268) is an operating system (254). Operating systems useful controlling the tactile visual indicator (101) according to embodiments of the present invention include UNIX™, Linux™, Microsoft XP™, AIX™, IBM's i5/OS™, and others as will occur to those of skill in the art. The operating system (254), and the control module (202) in the example of FIG. 2 are shown in RAM (268), but many components of such software typically are stored in non-volatile memory also, such as, for example, on a disk drive (270).

The computer (252) of FIG. 2 includes disk drive adapter (272) coupled through expansion bus (260) and bus adapter (258) to processor (256) and other components of the computer (252). Disk drive adapter (272) connects non-volatile data storage to the computer (252) in the form of disk drive (270). Disk drive adapters useful in computers for controlling the tactile visual indicator (101) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (252) of FIG. 2 includes one or more input/output ('I/O') adapters (278). I/O adapters implement user-oriented input/output through, for example, software drivers and computer hardware for controlling output to display devices such as computer display screens, as well as user input from user input devices (281) such as keyboards and mice. The example computer (252) of FIG. 2 includes a video adapter (209), which is an example of an I/O adapter specially designed for graphic output to a display device (280) such as a display screen or computer monitor. Video adapter (209) is connected to processor (256) through a high speed video bus (264), bus adapter (258), and the front side bus (262), which is also a high speed bus.

The exemplary computer (252) of FIG. 2 includes a communications adapter (267) for data communications with other computers (282) and for data communications with a data communications network (200). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for controlling the tactile visual indicator (101) according to embodiments of the present invention include modems for wired dial-up communications, Ethernet (IEEE 802.3) adapters for wired data communications network communications, and 802.11 adapters for wireless data communications network communications.

Figure 3:
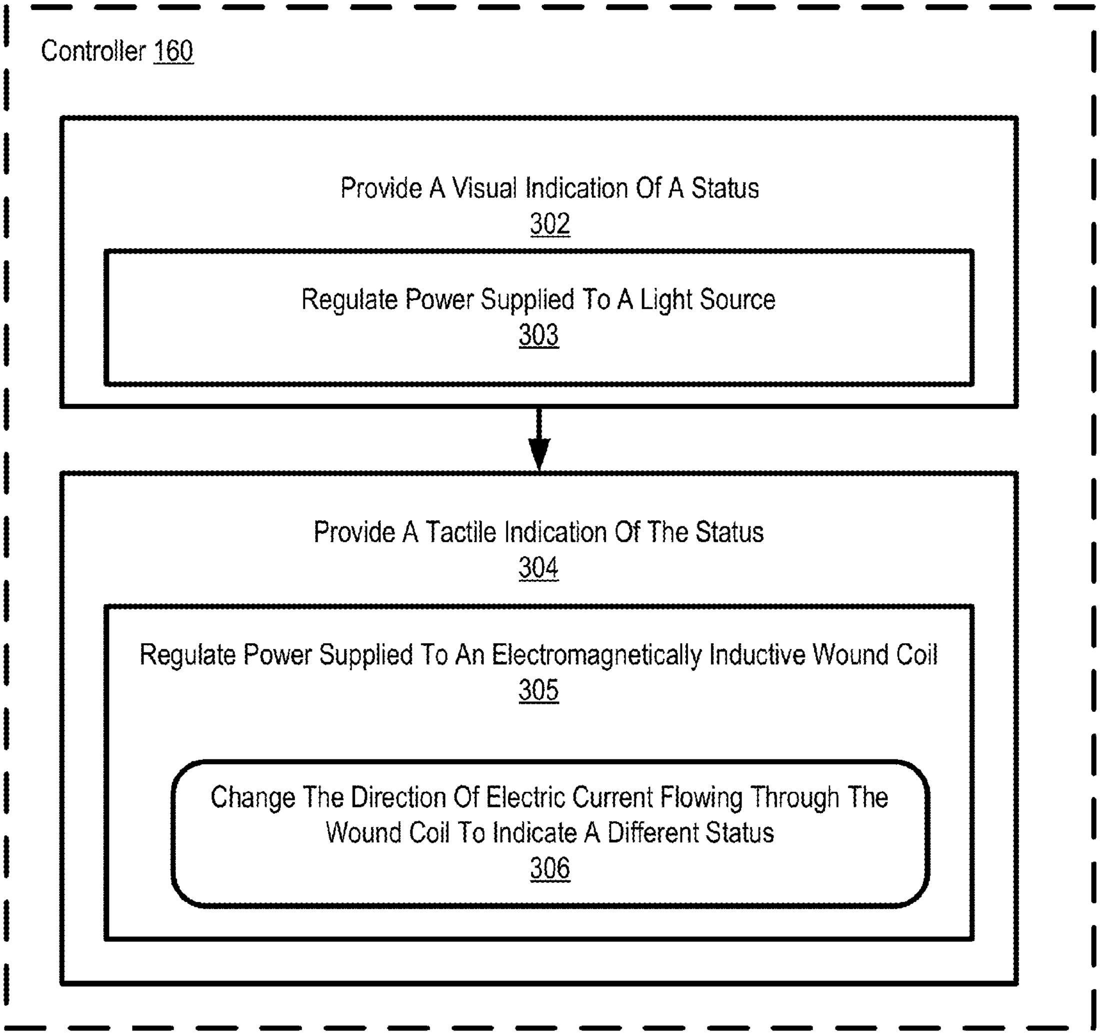

For further explanation, FIG. 3 sets forth a flow chart illustrating an exemplary method for controlling a tactile visual indicator according to embodiments of the present invention. The method of FIG. 3 includes providing (302), by a controller (160), a visual indication of a status. Providing (302) the visual indication may be carried out by turning a light emitting diode (LED) on or off. Providing (302) the visual indication includes regulating (303) power supplied to a light source. Regulating (303) power supplied to a light source may be carried out by turning power to a light source on or off.

The method of FIG. 3 also includes providing (304), by the controller (160), a tactile indication of the status. Providing (304) the tactile indication of the status may be carried out by moving a light pipe and jacket within a wound coil such the position of a cap of the tactile visual indicator provides an indication of a user touching the tactile visual indicator. Providing (304) the tactile indication includes regulating (305) power supplied to an electromagnetically inductive wound coil. Regulating (305) power supplied to an electromagnetically inductive wound coil may be carried out by turning power to wound coil on or off.

In the method of FIG. 3 regulating (305) the power supplied to the wound coil optionally includes changing (306), by the controller (160), the direction of electric current flowing through the wound coil to indicate a different status. Changing (306) the direction of electric current flowing through the wound coil may be carried out by providing electric current into one end of the wound coil to generate a first status and providing electric current into another end of the wound coil to generate a second status.

Exemplary embodiments of the present invention are described largely in the context of a fully functional computer system for controlling a tactile visual indicator. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A tactile visual indicator, the indicator comprising:
- a light source;
- an electromagnetically inductive wound coil; and
- a light pipe coupled to a ferromagnetic-metal jacket surrounding the outside of the light pipe, the ferromagnetic-metal jacket within the wound coil, one end of the light pipe provided to the light source; the light pipe and the ferromagnetic-metal jacket configured to move within the wound coil in response to the coil receiving power;
- wherein light shining through the light pipe from the light source provides a visual indication of a status and the movement of the light pipe and jacket within the wound coil provides a tactile indication of the status via contact with a user.

2. The indicator of claim 1 further comprising a controller configured to:
- regulate power supplied to the light source; and
- control the motion of the light pipe and ferromagnetic-metal jacket within the wound coil, wherein controlling the motion of the light pipe and ferromagnetic-metal jacket includes regulating power applied to the wound coil.

3. The indicator of claim 1 further comprising a first buffer coupled to one end of the wound coil and a second buffer coupled to the other end of the wound coil, the first buffer and the second buffer positioned on the wound coil to limit the motion of the light pipe and ferromagnetic jacket within the wound coil.

4. The indicator of claim 1 wherein one end of the light pipe includes a cap, the cap passing through light from the light source.

5. The indicator of claim 1 wherein the light source is a light emitting diode (LED).

6. A method of controlling a tactile visual indicator, the method comprising:
- providing, by a controller, a visual indication of a status, wherein providing the visual indication includes regulating power supplied to a light source; and
- providing, by the controller, a tactile indication of the status, wherein providing the tactile indication includes regulating power supplied to an electromagnetically inductive wound coil, the wound coil surrounding a light pipe with a ferromagnetic-metal jacket, the light pipe and jacket configured to move within the wound coil in response to the wound coil receiving power, the movement of the light pipe and jacket indicating the status via contact with a user, one end of the light pipe provided to the light source to allow light from the light source to shine through the light pipe.

7. The method of claim 6, wherein regulating the power supplied to the wound coil includes changing, by the controller, the direction of current flowing through the wound coil to indicate a different status.

8. The method of claim 6 wherein a first buffer coupled to one end of the wound coil and a second buffer coupled to the other end of the wound coil are positioned on the wound coil to limit the motion of the light pipe and ferromagnetic jacket within the wound coil.

9. The method of claim 6 wherein one end of the light pipe includes a cap, the cap passing through light from the light source.

10. The method of claim 6 wherein the light source is a light emitting diode (LED).

11. Apparatus for controlling a tactile visual indicator, the apparatus comprising a computer processor, a computer memory operatively coupled to the computer processor, the computer memory having disposed within it computer program instructions capable of:
- providing, by a controller, a visual indication of a status, wherein providing the visual indication includes regulating power supplied to a light source; and
- providing, by the controller, a tactile indication of the status, wherein providing the tactile indication includes regulating power supplied to an electromagnetically inductive wound coil, the wound coil surrounding a light pipe with a ferromagnetic-metal jacket, the light pipe and jacket configured to move within the wound coil in response to the wound coil receiving power, the movement of the light pipe and jacket indicating the status via contact with a user, one end of the light pipe provided to the light source to allow light from the light source to shine through the light pipe.

12. The apparatus of claim 11, wherein regulating the power supplied to the wound coil includes changing, by the controller, the direction of current flowing through the wound coil to indicate a different status.

13. The apparatus of claim 11 wherein a first buffer coupled to one end of the wound coil and a second buffer coupled to the other end of the wound coil are positioned on the wound coil to limit the motion of the light pipe and ferromagnetic jacket within the wound coil.

14. The apparatus of claim 11 wherein one end of the light pipe includes a cap, the cap passing through light from the light source.

15. The apparatus of claim 11 wherein the light source is a light emitting diode (LED).

16. A computer program product for controlling a tactile visual indicator, the computer program product disposed upon a non-transitory computer readable storage medium, the computer program product comprising computer program instructions capable, when executed, of causing a computer to carry out the steps of:

providing, by a controller, a visual indication of a status, wherein providing the visual indication includes regulating power supplied to a light source; and providing, by the controller, a tactile indication of the status, wherein providing the tactile indication includes regulating power supplied to an electromagnetically inductive wound coil, the wound coil surrounding a light pipe with a ferromagnetic-metal jacket, the light pipe and jacket configured to move within the wound coil in response to the wound coil receiving power, the movement of the light pipe and jacket indicating the status via contact with a user, one end of the light pipe provided to the light source to allow light from the light source to shine through the light pipe.

17. The computer program product of claim 16, wherein regulating the power supplied to the wound coil includes changing, by the controller, the direction of current flowing through the wound coil to indicate a different status.

18. The computer program product of claim 16 wherein a first buffer coupled to one end of the wound coil and a second buffer coupled to the other end of the wound coil are positioned on the wound coil to limit the motion of the light pipe and ferromagnetic jacket within the wound coil.

19. The computer program product of claim 16 wherein one end of the light pipe includes a cap, the cap passing through light from the light source.

20. The computer program product of claim 16 wherein the light source is a light emitting diode (LED).

* * * * *